United States Patent
Levenson et al.

(10) Patent No.: US 7,887,112 B1
(45) Date of Patent: Feb. 15, 2011

(54) FOOD CLIP UTENSIL

(76) Inventors: Donald R. Levenson, 562 Farmdale Cir., Blue Bell, PA (US) 19422; Michael P. Kind, 3219 Meridian Blvd., Warrington, PA (US) 18976

( * ) Notice: Subject to any disclaimer, the term of this patent is extended or adjusted under 35 U.S.C. 154(b) by 0 days.

(21) Appl. No.: 12/626,428

(22) Filed: Nov. 25, 2009

(51) Int. Cl.
B25B 7/02 (2006.01)
(52) U.S. Cl. ..................................... 294/99.2
(58) Field of Classification Search ............... 294/99.2, 294/100, 102.1; 24/477, 488, 491, 501, 522
See application file for complete search history.

(56) References Cited

U.S. PATENT DOCUMENTS

| | | | |
|---|---|---|---|
| 993,720 A | 5/1911 | Schneider | |
| D171,264 S * | 1/1954 | Peterson | D28/55 |
| 3,137,880 A * | 6/1964 | Kubit et al. | 294/99.2 |
| 3,264,909 A * | 8/1966 | Block | 294/99.2 |
| 3,280,665 A * | 10/1966 | Block | 294/99.2 |
| 3,331,626 A | 7/1967 | Kaufman | |
| 3,456,262 A * | 7/1969 | Coon | 24/501 |
| 4,802,704 A | 2/1989 | Burns | |
| 5,402,558 A * | 4/1995 | Santapa | 24/511 |
| 5,653,488 A | 8/1997 | Ordonez | |
| 5,709,423 A | 1/1998 | Romero | |
| 5,802,677 A * | 9/1998 | Dorman et al. | 24/30.5 R |
| D423,305 S | 4/2000 | Foster et al. | |
| 6,098,254 A * | 8/2000 | Willinger | 24/501 |
| 6,276,734 B1 | 8/2001 | Krieger | |
| 6,494,517 B1 | 12/2002 | Durant | |
| 6,761,386 B2 * | 7/2004 | Mandle et al. | 294/99.2 |
| 7,182,378 B2 * | 2/2007 | Inomata et al. | 294/99.2 |
| 7,287,791 B2 | 10/2007 | Carolina | |
| D561,948 S | 2/2008 | Stewart et al. | |
| 2003/0197390 A1 * | 10/2003 | Choi et al. | 294/99.2 |

* cited by examiner

Primary Examiner—Paul T Chin
(74) Attorney, Agent, or Firm—Michael Crilly, Esq.

(57) ABSTRACT

A clip-like device applicable to foods which are generally eaten by hand while grasping an extension therefrom is presented. The food clip includes first and second arms and a hinge. The first and second arms are generally planar and elongated elements forming a handle region and a grasping region. The hinge is disposed between and attached to the first and second arms. The hinge is comprised of a compressible and/or deformable yet resilient block-shaped element. The sides of the hinge are shaped so that the grasping region is normally closed and open when a force is applied to the handle region so as to deform the hinge. The grasping region presses against, nearly surrounds, and supports the extension from a food item when the first and second arms are closed. Food items could include, but are not limited to, meats, fish, foul, vegetables, prepared items, such as french fries and hotdogs, and other consumables eaten using a hand or a utensil.

19 Claims, 12 Drawing Sheets

FOOD CLIP UTENSIL

CROSS REFERENCE TO RELATED APPLICATIONS

None.

FEDERALLY SPONSORED RESEARCH AND DEVELOPMENT

None.

BACKGROUND OF THE INVENTION

1. Field of the Invention

The invention generally relates to a clip-like device applicable to foods which are generally eaten by hand while grasping an extension therefrom, examples including, but not limited to, spare ribs, chicken wings, and chicken legs. Specifically, the invention includes a pair of arms disposed about and attached to a compressible and/or deformable, yet resilient block-like hinge mechanism. The arms further include a handle region and a grasping region, the latter having extensions which surround, support, and secure the extension to the food clip device.

2. Background

Several holding utensils are provided in the related arts for use with food items typically eaten by hand.

Carolina, U.S. Pat. No. 7,287,791, and Durant, U.S. Pat. No. 6,494,517, describe holders for spare ribs, chicken wings, and other food items including a pair of elongated and substantially planar-shaped arms connected by a flexible joint at one end and having jaws at the other end. The arms and jaws are biased in the open position and closed to grasp a food item. The jaws do not support all sides of a food item and the flexible joint is bendable.

In another example, Romero, U.S. Pat. No. 5,709,423, describes a holder for chicken drumsticks and other food items. The holder includes a pair of jaws which are shaped and dimensioned to accommodate the fingers and thumb of a user enabling it to be manually closed. The utensil has a springy, hinge which acts to open the jaws upon release of finger pressure therefrom. The jaws have pairs of opposing rows of teeth, and the rows are outwardly curved to form a gap therebetween to accommodate the shape of the food and provide more secure gripping thereof. The jaws do not support all sides of a food item and the flexible joint is bendable.

In yet another example, Burns, U.S. Pat. No. 4,802,704, describes a spare rib holder including two oppositely disposed members pivotally joined at one end to simulate retractable jaws, the members being spring biased with respect to each other so as to normally be in open position, the free ends of both members being provided with oppositely disposed teeth for grasping a spare rib therebetween, the lower member having a ramp projecting forwardly therefrom for leading a spare rib to the jaws. Extension of the ramp beyond the jaws minimizes the length of a spare rib disposed within the jaws, thereby frustrating support along all sides of the rib section by the jaws. Furthermore, functionality of the joint is via a coiled spring which is difficult to clean after use.

In one other example, Foster et al., U.S. Pat. No. D423,305, describes a rib holder including two planar-shaped arms pivotally joined along their length by a spring joint biased in the closed position. The arms include teeth to grasp a spare rib. The arms and teeth do not support all sides of a spare rib and functionality of the joint is via a coiled spring which is difficult to clean after use.

Adequate support of a food item within a holder utensil is particularly problematic for food items which include meat covered bones.

For example, the removal of meat from a bone requires both biting and pulling actions along an infinite number of vectors. The pulling action in particular exerts a force which could move or dislodge the food item from the holder when along a direction without proper support.

Also, the clamping force exerted by a normally-closed, spring-based jaw must balance the holding capability of the device with usability, namely, the ability to be opened by the force applied by a user's hand.

Further, the clamping force exerted by a user's hand onto a normally open device with bendable hinges is limited by the strength and endurance of the user.

Accordingly, the related arts do not include a device that allows a user to securely grasp and hold a food item so as to prevent movement of the item with respect to the device as meat is torn or ripped from a bone.

Therefore, what is required is a food holder utensil which securely grasps and holds a food item so as to minimize movement of the item with respect to the device as the item is consumed.

SUMMARY OF THE INVENTION

An object of the present invention is to provide a food holder utensil which securely grasps and holds a food item so as to minimize movement of the item with respect to the device as the item is consumed.

In accordance with embodiments of the invention, the food clip includes first and second arms and a hinge. The first and second arms are generally planar and elongated elements forming a handle region and a grasping region. The hinge is disposed between and attached to the first and second arms along the handle region. The hinge is a compressible and/or deformable, yet resilient block-like element. The side walls of the hinge are shaped so that the grasping region is normally closed and open when an inward force is applied onto the handle region so as to compress or otherwise deform the hinge. The grasping region presses against and nearly surrounds a bone or other extension from a food item when the first and second arms are closed.

In accordance with other embodiments of the invention, the hinge could be polygonal shaped and disposed in a tapered arrangement with at least one cavity or slot therein.

In accordance with other embodiments of the invention, the hinge could have a perimeter that is partially or completely arcuate.

In accordance with other embodiments of the invention, the first arm could have a first upper extension extending substantially perpendicular from the top edge along the grasping region and the second arm could have a second upper extension extending substantially perpendicular from the top edge and a lower extension extending substantially perpendicular from the bottom edge along the grasping region.

In accordance with other embodiments of the invention, the lower extension could function as a scoop-like spatula.

In accordance with other embodiments of the invention, at least one edge along first and second arms within the grasping region and/or the lower extension could be serrated for use in cutting food and/or separating bones.

In accordance with other embodiments of the invention, the hinge could be comprised of a polymer, elastomer, rubber, or foam.

In accordance with other embodiments of the invention, the hinge could be attached to the first and second arms via fasteners which are either removable or fixed to the hinge.

In accordance with other embodiments of the invention, each fastener could include at least one tab and each tab resides within a pair of aligned slots through the first arm and the hinge or the second arm and the hinge.

In accordance with other embodiments of the invention, first and said second arms could be bonded to the hinge.

In accordance with other embodiments of the invention, the hinge could include at least two tabs and each tab resides within slots aligned and through the first arm and the hinge and slots aligned and through the second arm and the hinge.

In accordance with other embodiments of the invention, the tabs could be mechanically secured to the slots.

Several benefits are noteworthy. The invention adequately supports the sides of a bone or other extension from a food item so as to ensure proper alignment with respect to the holder regardless of the magnitude and direction of forces applied by the teeth and mouth of a user. The invention is composed of food grade, dishwasher safe, and cleanable materials, thus minimizing the growth of bacteria, molds, and other contaminants on and between the elements comprising the food clip. The invention allows a user to separate a spare rib from a rack of ribs and consume the rib with one hand without direct contact between the food item and the user's hand. The invention reduces the need for napkins by avoiding contact with the food item, thus promoting the conservation of nature resources and reducing waste products destined for landfills. The solid-state construction of the hinge avoids the accumulation of food particles common to spring-based devices. The invention could be manufactured in a sterile, hands-free environment.

| REFERENCE NUMERALS | |
|---|---|
| 1 | Food clip |
| 2 | First arm |
| 3 | Second arm |
| 4 | Hinge |
| 5 | Fastener |
| 6 | Grip |
| 7 | Handle region |
| 8 | Grasping region |
| 9 | Upper extension |
| 10 | Lower extension |
| 11 | Front edge |
| 12 | Top edge |
| 13 | Side edge |
| 14 | Cavity |
| 15 | Side wall |
| 16 | Back wall |
| 17 | Front wall |
| 18 | Slot |
| 19 | Base |
| 20 | Tab |
| 21 | Recess |
| 22 | Slot |
| 23 | Angle |
| 24 | Tab |
| 25 | Slot |
| 26 | Teeth |
| 27 | Hand |
| 28 | Inward force |
| 29 | Spare rib |
| 30 | End |
| 31 | Bottom edge |
| 32 | Interior surface |
| 33 | Front end |
| 34 | Exterior surface |
| 35 | Plate |
| 36 | Compressive force |
| 37 | Side |

BRIEF DESCRIPTION OF THE INVENTION

Additional aspects, features, and advantages of the invention will be understood and will become more readily apparent when the invention is considered in the light of the following description made in conjunction with the accompanying drawings.

DETAILED DESCRIPTION OF THE INVENTION

Reference will now be made in detail to several preferred embodiments of the invention that are illustrated in the accompanying drawings. Wherever possible, same or similar reference numerals are used in the drawings and the description to refer to the same or like parts. The drawings are not to precise scale. While various features are separately described herein, it is understood that two or more such features could be combined into a single embodiment. Components are preferred to be composed of food grade materials and manufactured via techniques understood in the art.

Figure 1:
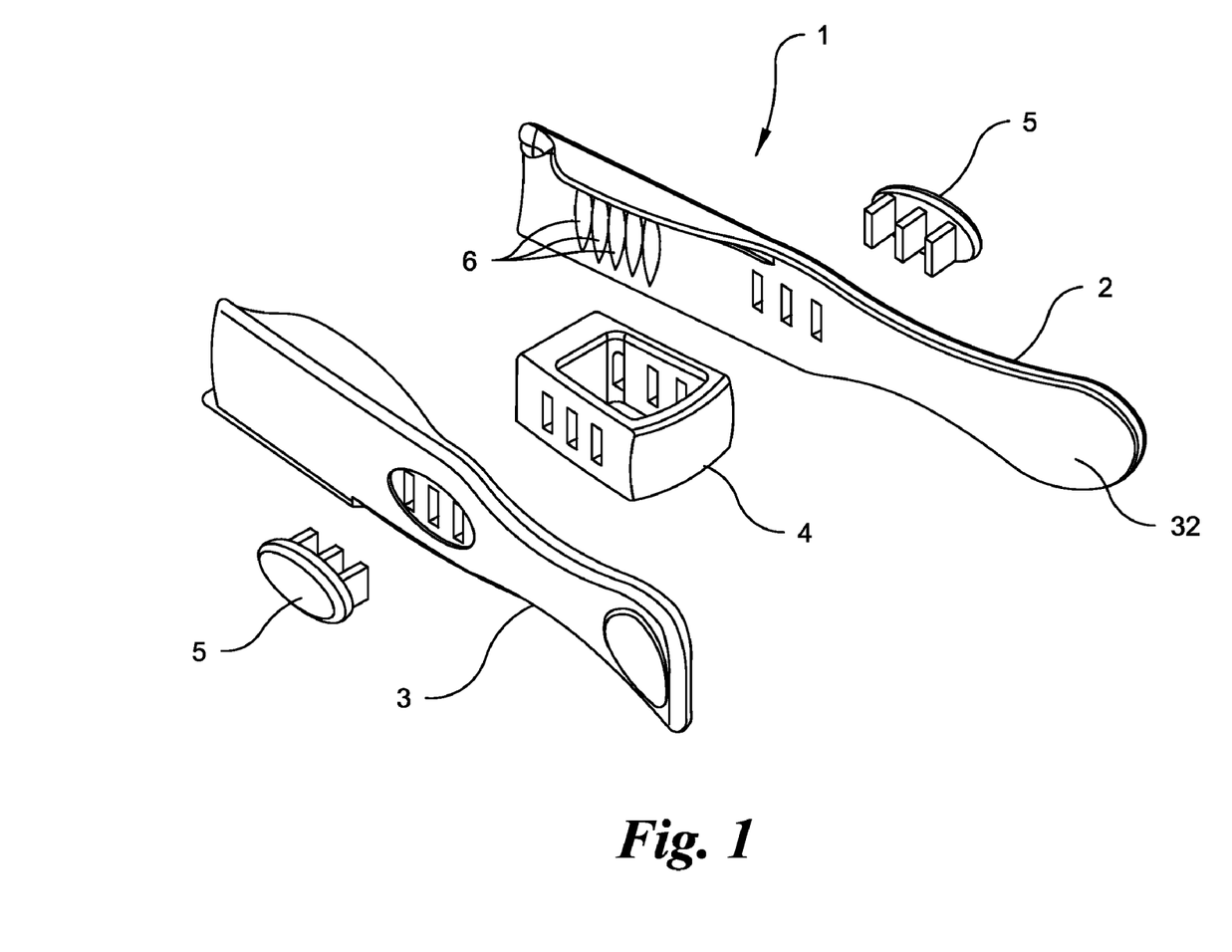
FIG. 1 is an exploded view illustrating arrangement of first and second arms, a hinge, and fasteners for a food clip in accordance with an embodiment of the invention.

Referring now to FIG. 1, the food clip 1 in its simplest form includes a first arm 2 and a second arm 3 disposed about a hinge 4. The first and second arms 2, 3 are generally planar, elongated elements which are either rigid or semi-rigid. The first and second arms 2, 3 could be comprised of one or more polymers, examples including, but not limited to, formulations of polyethylene or polypropylene. The hinge 4 is a block-shaped element comprised of one or more compressible and/or deformable, yet resilient materials which could be either injection molded or otherwise formed to the desired shape via techniques understood in the art. Exemplary materials food grade could include polymers, rubbers, elastomers, and foams. In preferred embodiments, the hinge 4 is nearly as wide as the first and second arms 2, 3. The first and second arms 2, 3 could be attached and fixed to the hinge 4 via an adhesive or mechanically attached thereto via a pair of fasteners 5.

Figure 2:
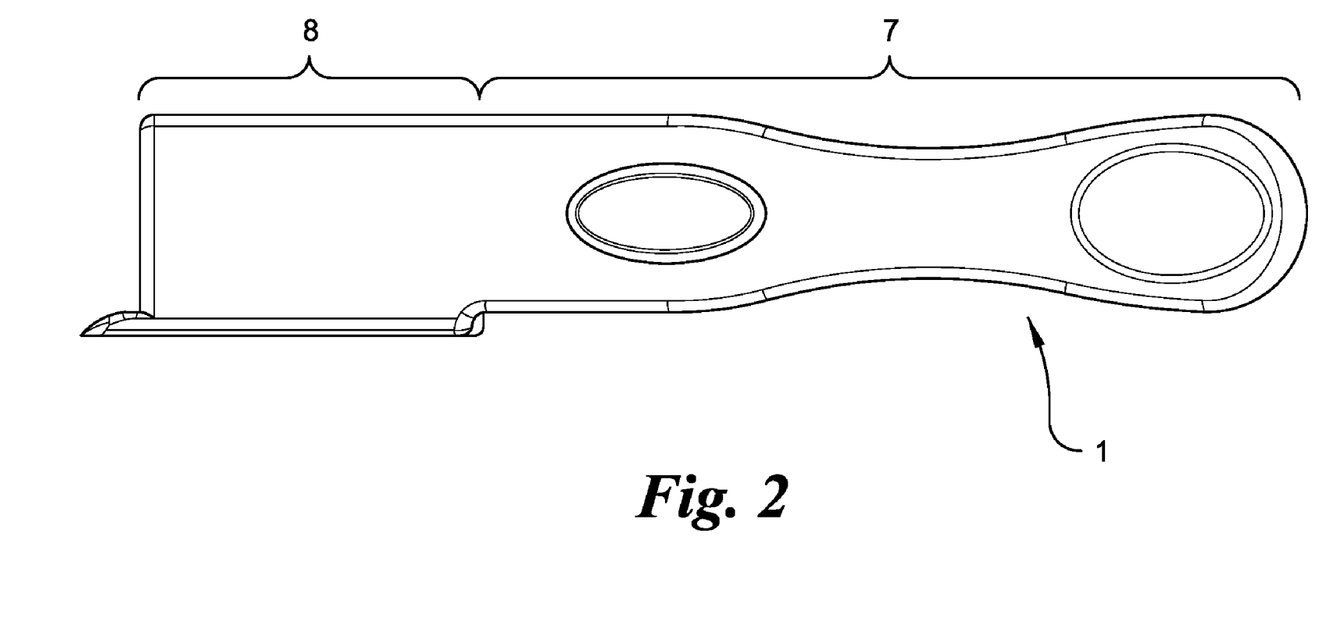
FIG. 2 is a side view illustrating the handle and grasping regions along the food clip in accordance with an embodiment of the invention.

Referring now to FIG. 2, the food clip 1 is shown including a handle region 7 and a grasping region 8. The handle region 7 allows a user to grasp, hold, and operate the food clip 1 with one hand. As such, it is preferred for the handle region 7 to be ergonomically designed to complement the shape of a user's hand. The grasping region 8 is generally defined to include the length of the food clip 1 which extends beyond the handle region 7 and the hinge 4. The grasping region 8 could include various design elements which holds and supports a food item, one example being a plurality of grips 6 which extend from the interior surface 32 of the first and second arms 2, 3, as shown in FIG. 1. Grips 6 could include notches, knurls, or other surface features which enhance contact between the first and second arms 2, 3 and a food item.

Figure 3:
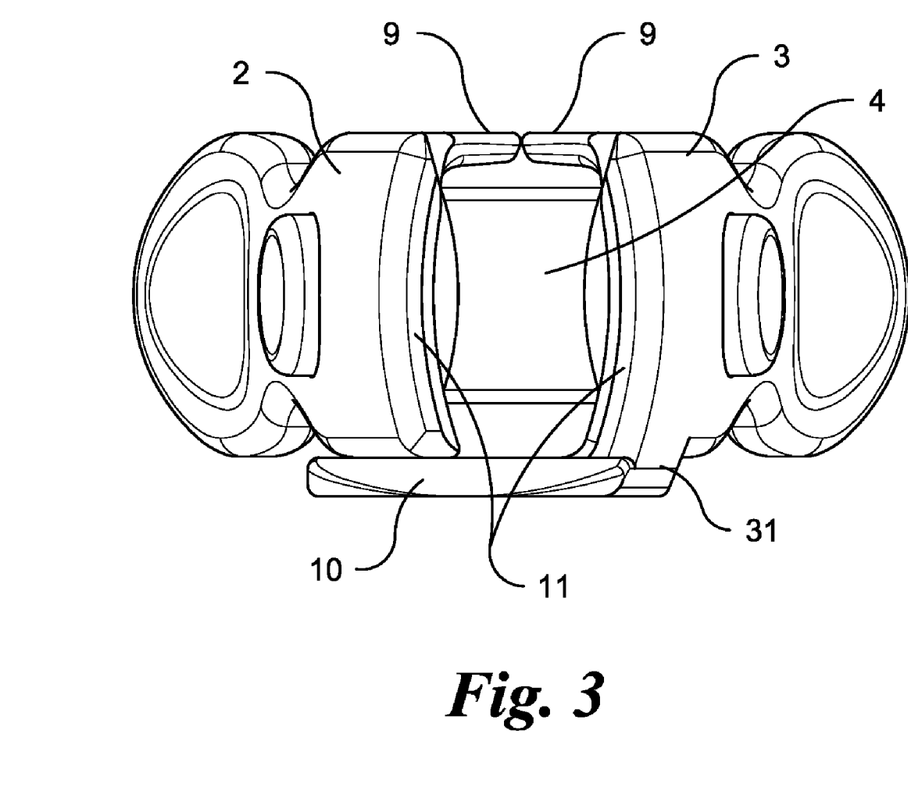
FIG. 3 is an enlarged front view illustrating the food clip in the closed position and arrangement of the first arm with an upper extension and the second arm with upper and lower extensions in accordance with an embodiment of the invention.
Figure 4:
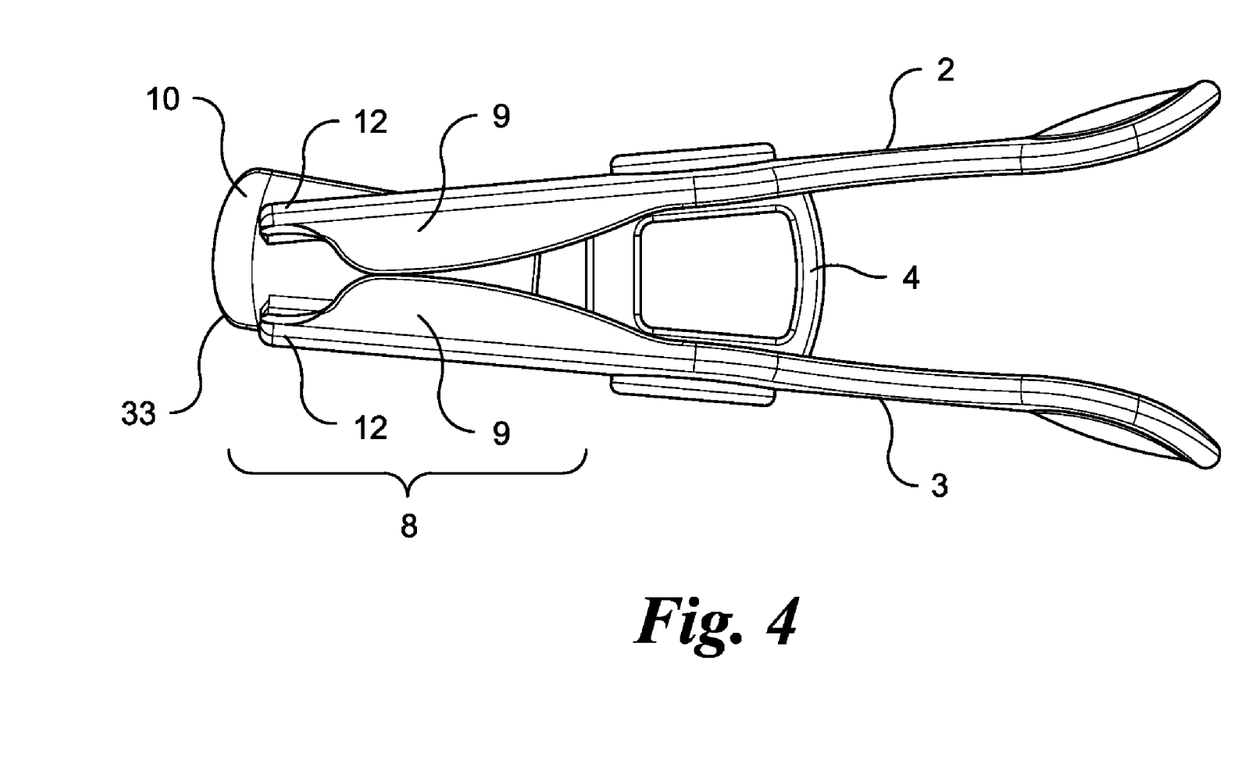
FIG. 4 is top view illustrating the first and second arms of the food clip attached to the hinge and angled so that the upper extensions contact or nearly contact in the closed position in accordance with an embodiment of the invention.
Figure 5:
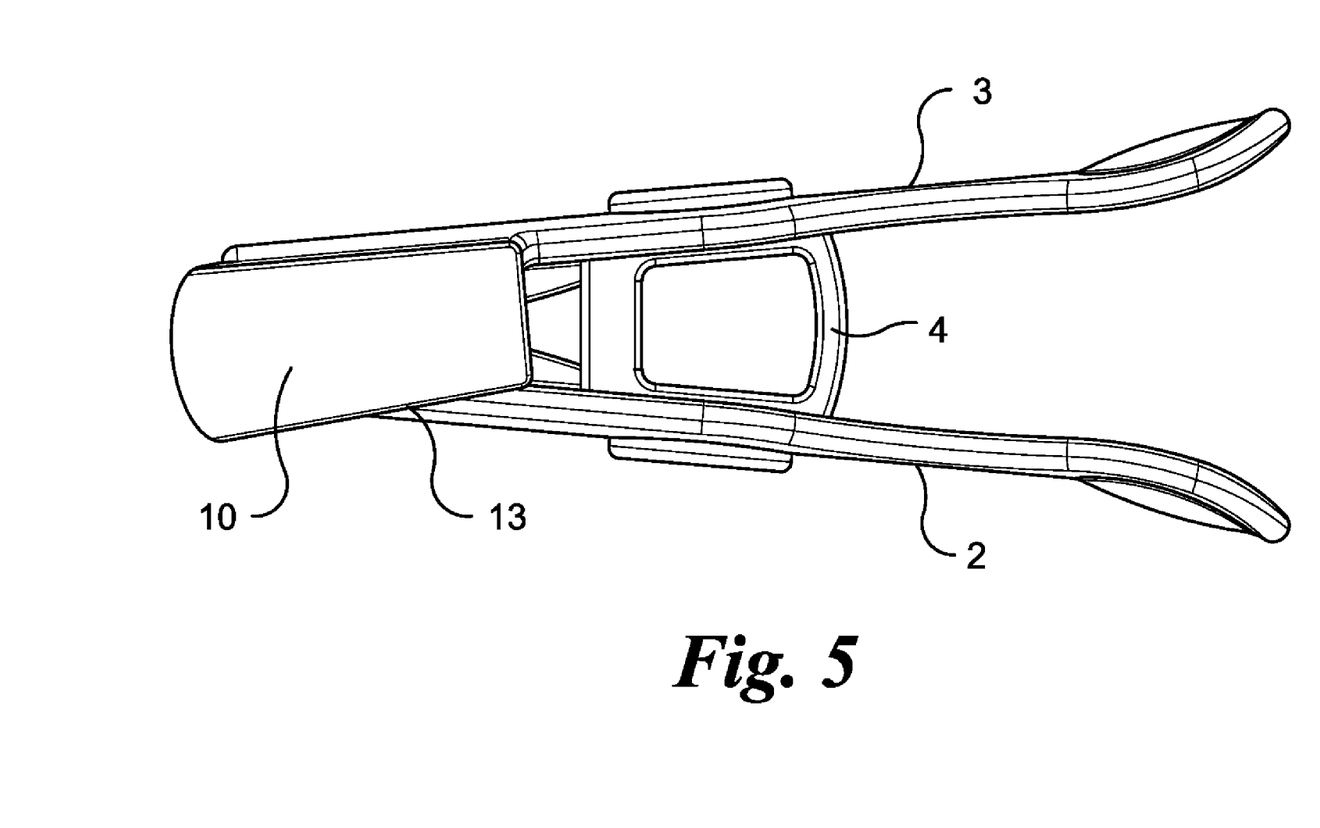
FIG. 5 is a bottom view illustrating the overlap of the lower extension along the second arm with the first arm in the closed position in accordance with an embodiment of the invention.

Referring now to FIGS. 3-5, the first and second arms 2, 3 are attached to the hinge 4 so as to be in the normally closed position so that the first and second arms 2, 3 contact or nearly contact each other. The hinge 4 is shaped so that contact with the first and second arms 2, 3 prefers an inward angular arrangement along the grasping region 8.

The first and second arms 2, 3 each have an upper extension 9 attached to the top edge 12 and extending therefrom in a substantially perpendicular and inward arrangement. The upper extensions 9 are generally planar elements which are arcuate shaped along one side so as to allow for contact or near contact along a portion of the two structures within the grasping region 8 when in the closed position.

The second arm 3 further includes a lower extension 10 attached to and extending from the bottom edge 31 thereof in a substantially perpendicular arrangement. The lower extension 10 is a generally rectangular, planar element which extends towards and, preferably, at least partially beyond the first arm 2, as represented in FIGS. 3 and 4. The front end 33 of the lower extension 10 could slightly extend beyond the front edge 11 of the first and second arms 2, 3 so as to form a scoop-like spatula structure. In some embodiments, the front end 33 could be tapered to facilitate placement of the lower extension 10 between the end of a food item and a support surface.

The upper extensions 9 and lower extension 10 are attached or otherwise fixed to the edges of the first and second arms 2, 3. For example, the upper and lower extensions 9, 10 could be molded onto the first and second arms 2, 3 during fabrication thereof. In another example, the upper and lower extensions 9, 10 could be mechanically or adhesively attached to the first and second arms 2, 3.

The first and second arms 2, 3, upper extensions 9, and lower extension 10 form a substantially rectangular-shaped opening when in the closed position, as represented in FIG. 3. The opening could nearly approximate the dimensions of a representative food item supported within the grasping region 8. In some embodiments, the front edge 11 of the first and second arms 2, 3 could include a slightly arcuate shape, as represented in FIG. 3, so as to approximate the curvature of food items. In yet other embodiments, the lower extension 10 could sufficiently extend beyond the first arm 2 so as to overlap the first arm 2 over at least a portion of the angular range of the first and second arms 2, 3 when in the open position. In still other embodiments, the upper extensions 9 could sufficiently overlap in the closed position and for at least a portion of the open range of motion. In still further embodiments, the maximum separation between the upper extensions 9 could minimize the possibility of a pinch hazard when the first and second arms 2, 3 are completely open. In preferred embodiments, the first and second arms 2, 3, upper extensions 9, and lower extension 10 should contact and support the sides of a food item within the grasping region 8.

Figure 6A:
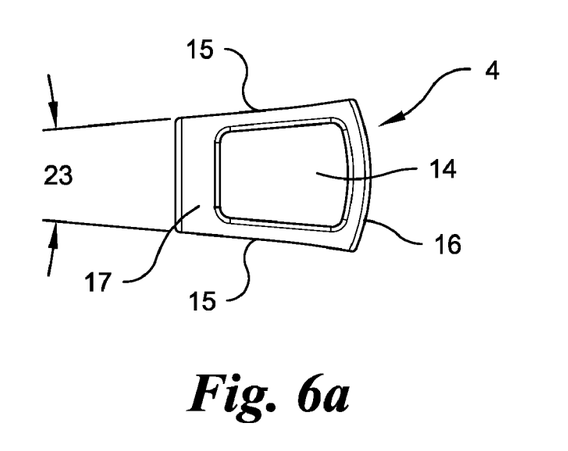
FIG. 6a is a top view illustrating the hinge in accordance with an embodiment of the invention.
Figure 6B:
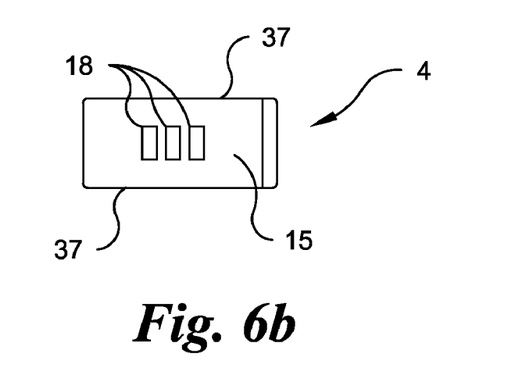
FIG. 6b is a side view illustrating slots along the side walls of the hinge in accordance with an embodiment of the invention.

Referring now to FIGS. 6a and 6b, an exemplary hinge 4 is shown as a six-sided block with a four-sided, polygon-shaped profile; although, it is understand that other polygonal-shaped profiles are possible. In general terms, the hinge 4 is a block-like element with a pair of sides 37 disposed in either a parallel or non-parallel arrangement and separated so as to approximate the width of the first and second arms 2, 3; however, other thicknesses are possible. The compressibility and overall deformability of the hinge 4 is preferred to allow a user to open and close the grasping region 8 via a force applied with the fingers and thumb of one hand; however, the resiliency of the hinge 4 should be sufficient to apply a force onto a food item within the grasping region 8 so as to hold or otherwise clamp the item therein. In preferred embodiments, at least one optional cavity 14 could completely or partially traverse the thickness of the hinge 4 so as to reduce the force required to open the first and second arms 2, 3 along the grasping region 8.

In preferred embodiments, the hinge 4 includes a pair of side walls 15, a back wall 16, and a front wall 17. The side walls 15 are disposed in a tapered arrangement forming an acute angle 23 so that the first and second arms 2, 3 are biased in the normally closed position. This arrangement requires the back wall 16 to be longer than the front wall 17. In preferred embodiments, the ratio of the lengths of the side walls 15 to the front and back walls 17, 16 could be approximately 1.3 and 1.6, respectively. It is also possible for the back wall 16 to be arcuate shaped so as to reduce the force required to open and close the first and second arms 2, 3 in response to compression and/or deformation of the hinge 4.

Figure 7:
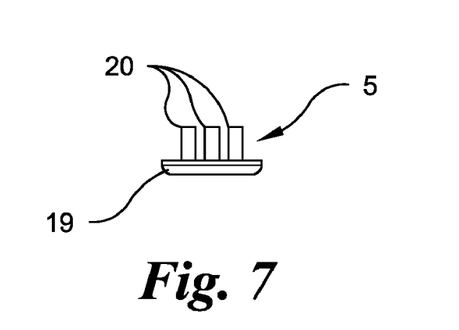
FIG. 7 is a side view illustrating arrangement of the base and tabs of a fastener in accordance with an embodiment of the invention.
Figure 8:
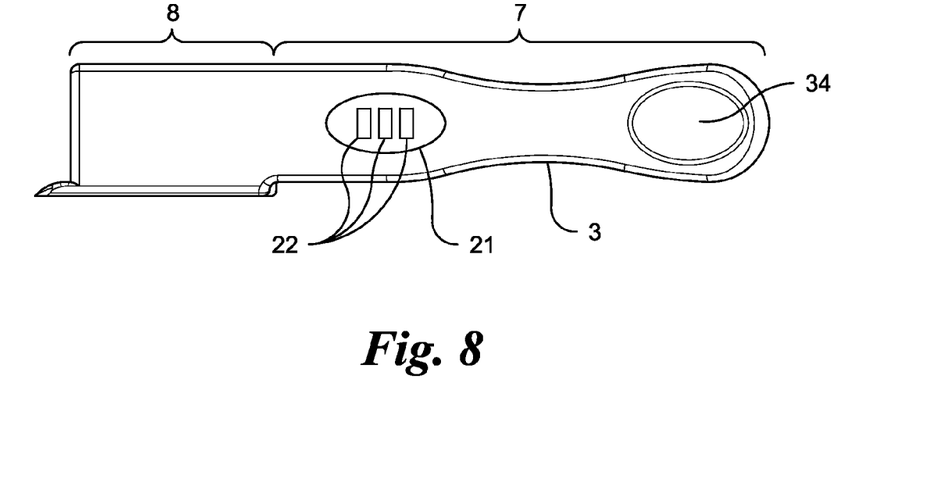
FIG. 8 is a side view illustrating slots and recess allowing attachment of the first and second arms to the hinge via the fasteners in accordance with an embodiment of the invention.
Figure 9:
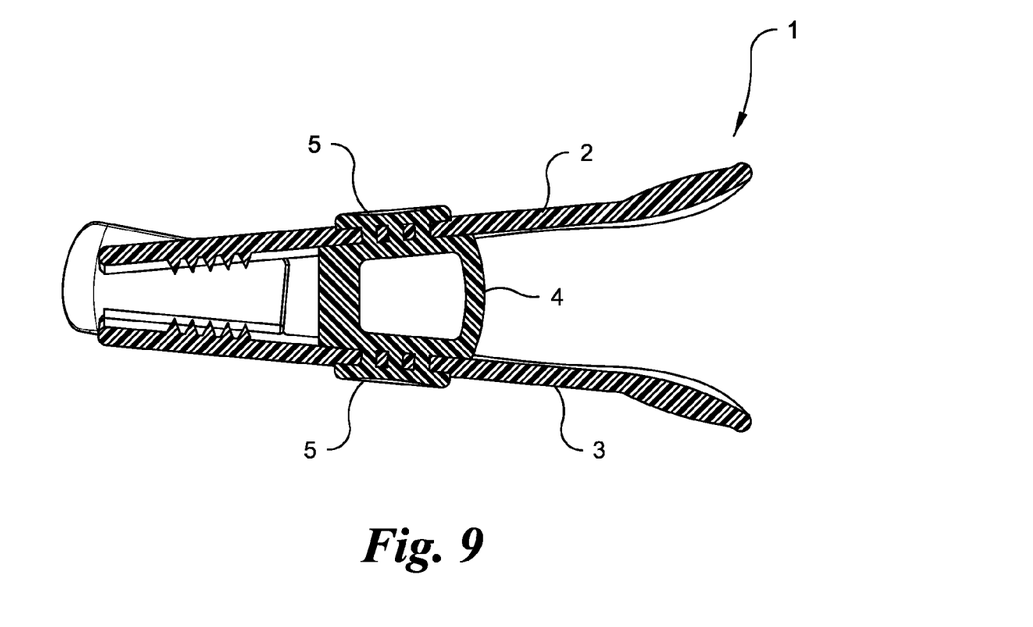
FIG. 9 is a top section view illustrating a hinge and fasteners molded onto and between a pair of arms as a single element in accordance with an embodiment of the invention.

Referring now to FIGS. 6b, 7, and 8, an exemplary hinge 4, fastener 5, and food clip 1 are shown, respectively, for an embodiment wherein the first and second arms 2, 3 are mechanically attached to the hinge 4. Like-sized, rectangular-shaped slots 18, 22 extended through the side wall 15 and the second arm 3, respectively, along the handle region 7 adjacent to the grasping region 8. The slots 18, 22 are likewise spaced along the side wall 15 and second arm 3 so as to overlap and align when the second arm 3 is assembled onto the hinge 4. The fastener 5 is shown including a substantially planar base 19 with rectangular-shaped tabs 20 extending therefrom in a substantially perpendicular arrangement; however, other designs are possible. The base 19 could include a button-like depression or other ergonomic feature facilitating contact with a finger or thumb. The tabs 20 are dimensioned and spaced so as to align with and pass through the paired arrangement of slots 18, 22 along the hinge 4 and second arm 3. In some embodiments, the tabs 20 could include a flange or barb or be dimensioned so as to form an interference fit with the slots 18, 22, thereby providing a mechanical interlock between the components and allowing the food clip 1 to be disassembled for cleaning purposes. In other embodiments, the tabs 20 could be slightly smaller than the slots 18, 22, thus requiring application of an adhesive or other bonding material to properly fix and secure the tabs 20 within the slots 18, 22. In yet other embodiments, it might be advantageous to include a recess 21 which approximates the shape of the base 19 along the exterior surface 34 of the second arm 3, as represented in FIG. 8, so that the fastener 5 is flush or nearly flush along the exterior surface 34. This feature minimizes interaction between the fastener 5 and a user's hand. In yet further embodiments, the hinge 4 and fasteners 5 could be directly insert molded or formed onto the first and second arms 2, 3 as a single, integral element, as represented in FIG. 9. The construction and assembly described herein for the second arm 3 is likewise applicable to the first arm 2.

Figure 10A:
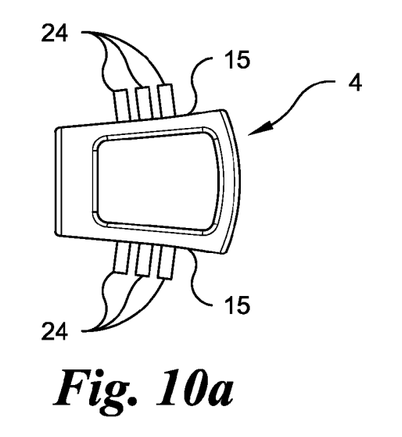
FIG. 10a is a top view illustrating a hinge with an optional cavity and tabs extending from the side walls thereof in accordance with an embodiment of the invention.

Referring now to FIG. 10a, the hinge 4 with an optional cavity 14 is shown including tabs 24, like those described herein, extending substantially perpendicular from the side walls 15 thereof. In this embodiment, the tabs 24 are dimensioned and aligned so as to pass through the slots 22 along the first and second arms 2, 3. The tabs 24 could mechanically interlock with the slots 22 via an interference fit, flange, or barb or require an adhesive to fix and secure the tabs 24 within the slots 22. This embodiment eliminates the fasteners 5 described herein.

Figure 10B:
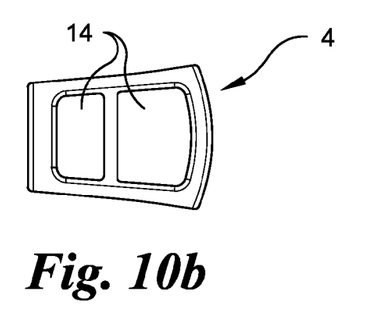
FIG. 10b is a top view illustrating a hinge with two optional cavities in accordance with an embodiment of the invention.
Figure 10C:
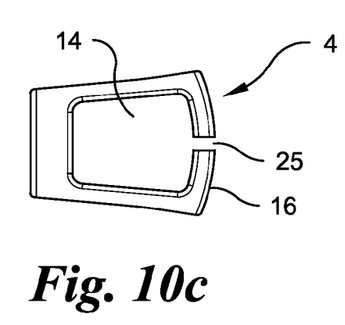
FIG. 10c is a top view illustrating a hinge with an optional cavity and a slot along the back wall in accordance with an embodiment of the invention.
Figure 10D:
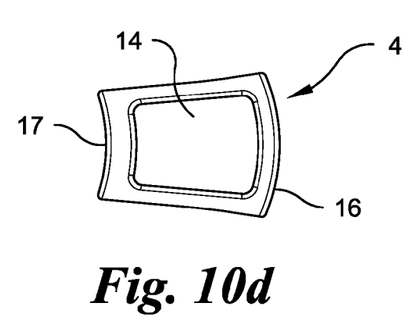
FIG. 10d is a top view illustrating a hinge with an optional cavity and curved front and back walls in accordance with an embodiment of the invention.
Figure 10E:
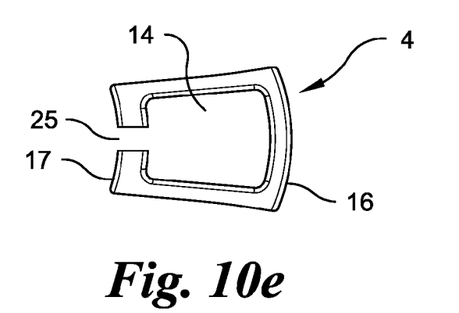
FIG. 10e is a top view illustrating a hinge with an optional cavity and curved front and back walls with a slot along the front wall in accordance with an embodiment of the invention.
Figure 10F:
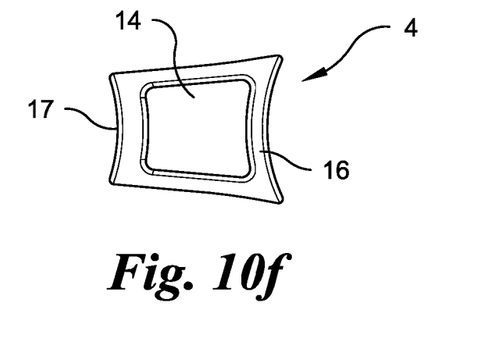
FIG. 10f is a top view illustrating another hinge with an optional cavity and curved front and back walls and side walls in a tapered arrangement in accordance with an embodiment of the invention.
Figure 10G:
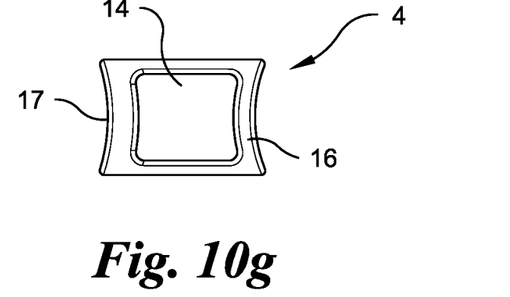
FIG. 10g is a top view illustrating another hinge with an optional cavity and curved front and back walls and side walls in a non-tapered arrangement in accordance with an embodiment of the invention.
Figure 10H:
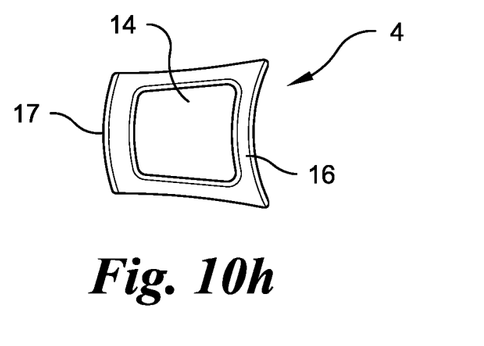
FIG. 10h is a top view illustrating yet another hinge with an optional cavity and curved front and back walls in accordance with an embodiment of the invention.
Figure 10I:
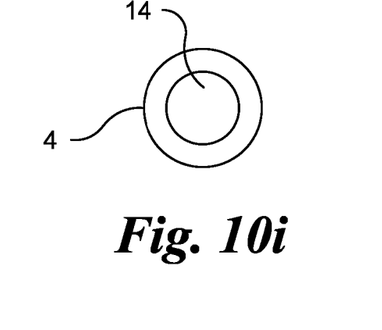
FIG. 10i is a top view illustrating a circular-shaped hinge with optional cavity in accordance with an embodiment of the invention.

Referring now to FIGS. 10b-10i, several exemplary alternate embodiments are shown for the hinge 4 with an optional cavity 14 and a perimeter that is partially or completely arcuate shaped. In FIG. 10b, the hinge 4 is shown including a pair of optional cavities 14 which completely or partially traverse the thickness thereof. In FIGS. 10c and 10e, the hinge 4 is shown including a slot 25 which partially or completely traverses the back wall 16 and front wall 17, respectively, so as to further reduce the applied force required to deform the hinge 4. In FIGS. 10d and 10f-10h, the hinge 4 is shown with a back wall 16 and a front wall 17 which are disposed in complimentary and opposed arrangements. In FIG. 10i, the hinge 4 is shown having a completely arcuate shape so as to form a circle. It is understood that other shapes are possible including, but not limited to, ellipses, ovals, and other polygons with and without cavities.

Figure 11:
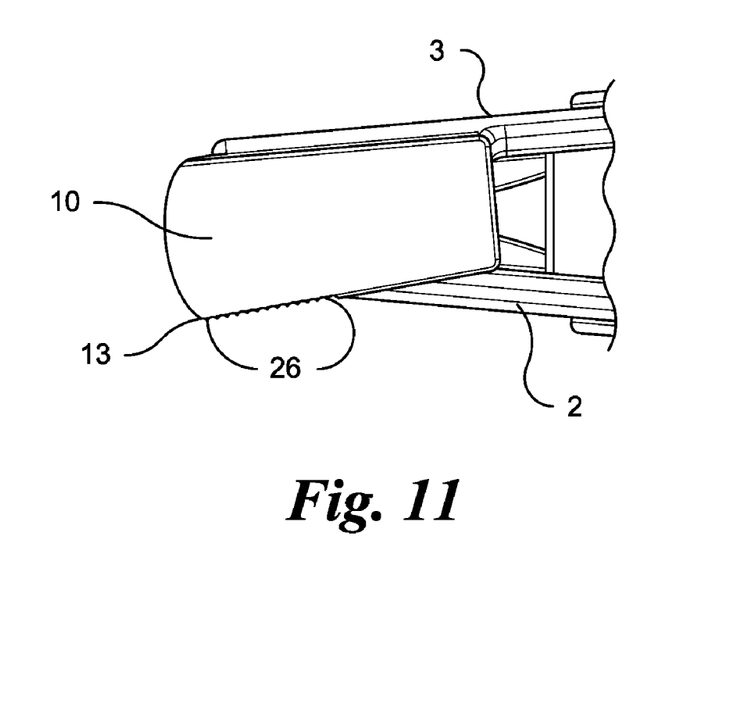
FIG. 11 is an enlarged bottom view illustrating a lower extension with a serrated edge in accordance with an embodiment of the invention.

Referring now to FIG. 11, the lower extension 10 is shown having a plurality of optional teeth 26 along a side edge 13 thereof. Teeth 26 are spaced along the side edge 13 so as to form a serrated cutting edge which could be used to cut, score, and/or separate a spare rib individually from a rack of ribs. In this embodiment, the side edge 13 could extend from the second arm 3 beyond the first arm 2, as represented in FIG. 11, so as to allow the lower extension 10 to completely or nearly completely penetrate the thickness of a rack of ribs without interference from the first arm 2.

Figure 12:
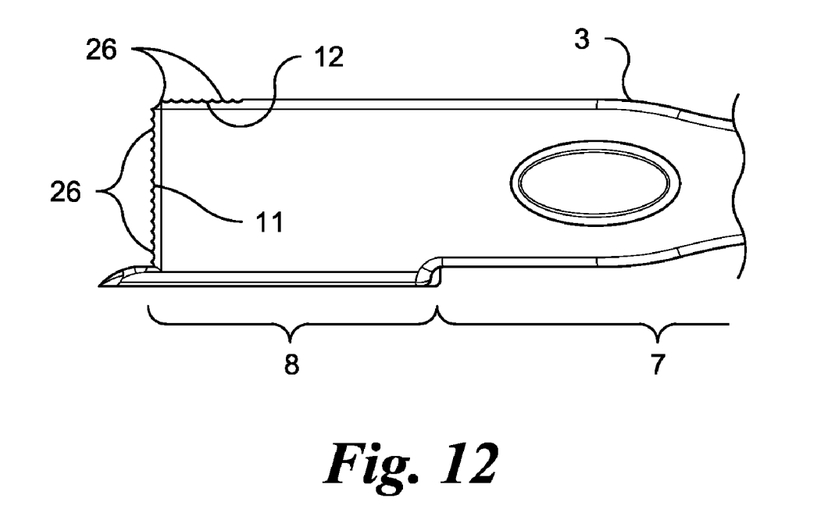
FIG. 12 is an enlarged side view illustrating an arm with serrated top and front edges in accordance with an embodiment of the invention.

Referring now to FIG. 12, the top edge 12 and front edge 11 of the second arm 3 are shown each including a plurality of optional teeth 26 so as to form serrated cutting edges which could be used to cut, score, and/or separate ribs from a rack. In preferred embodiments, the serration length could be sufficient so as to allow the second arm 3 to penetration the thickness of a rack of ribs without undue interference from the upper and/or lower extensions 9, 10. It is also preferred that the teeth 26 be placed along the first arm 2 so that the cutting action is applicable to both sides about a bone for a rib along a rack. This cutting action might require the user to apply a compression force onto the handle region 7 so as to separate the first and second arms 2, 3 and open the grasping region 8. Teeth 26 could be molded onto or cut into the respective elements via techniques understood in the art.

Figure 13A:
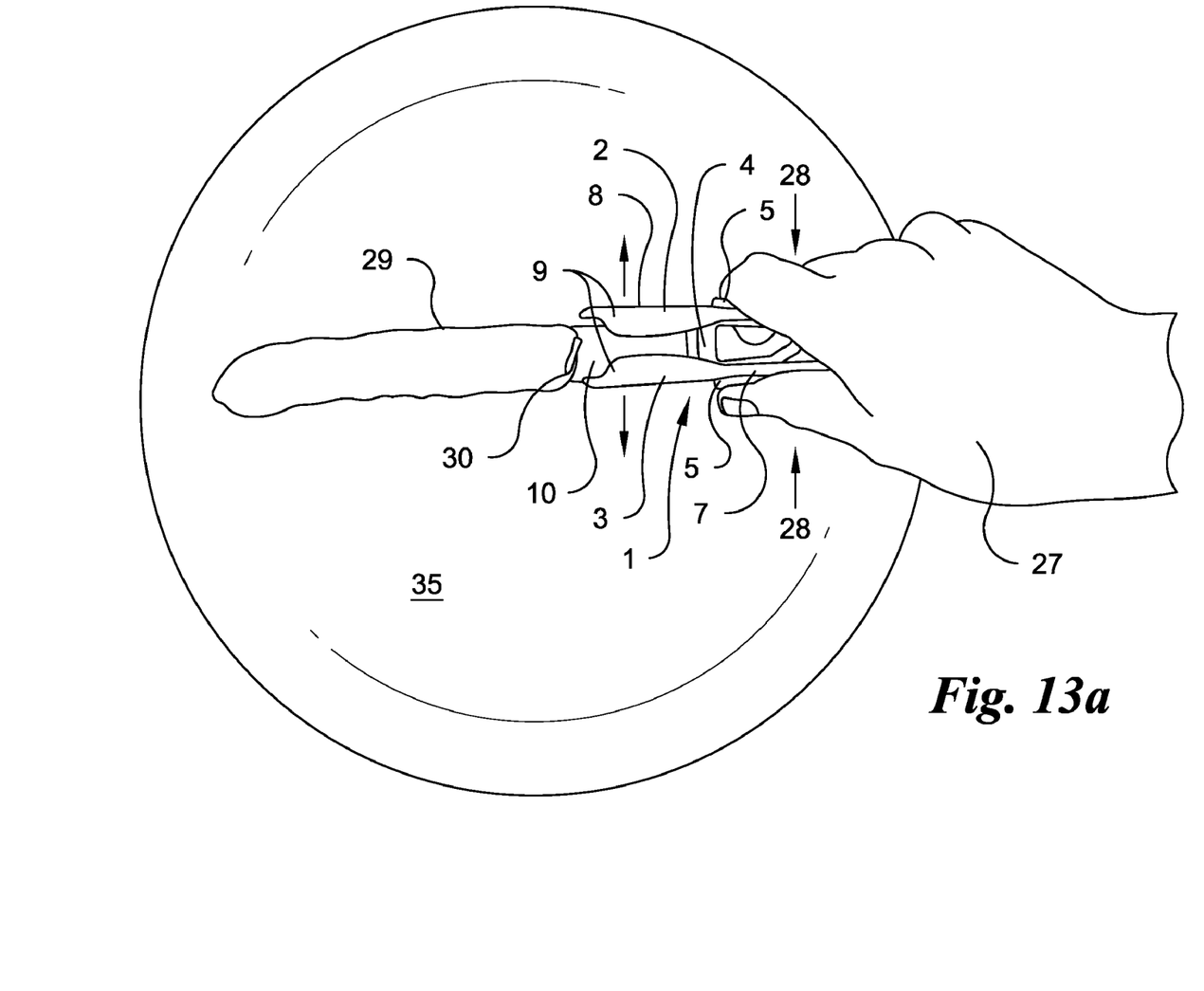
FIG. 13a is a top view illustrating compression and deformation of a hinge by a hand so that the first and second arms are in the open position allowing insertion of one end along a spare rib onto a lower extension and into the grasping region of the food clip in accordance with an embodiment of the invention.
Figure 13B:
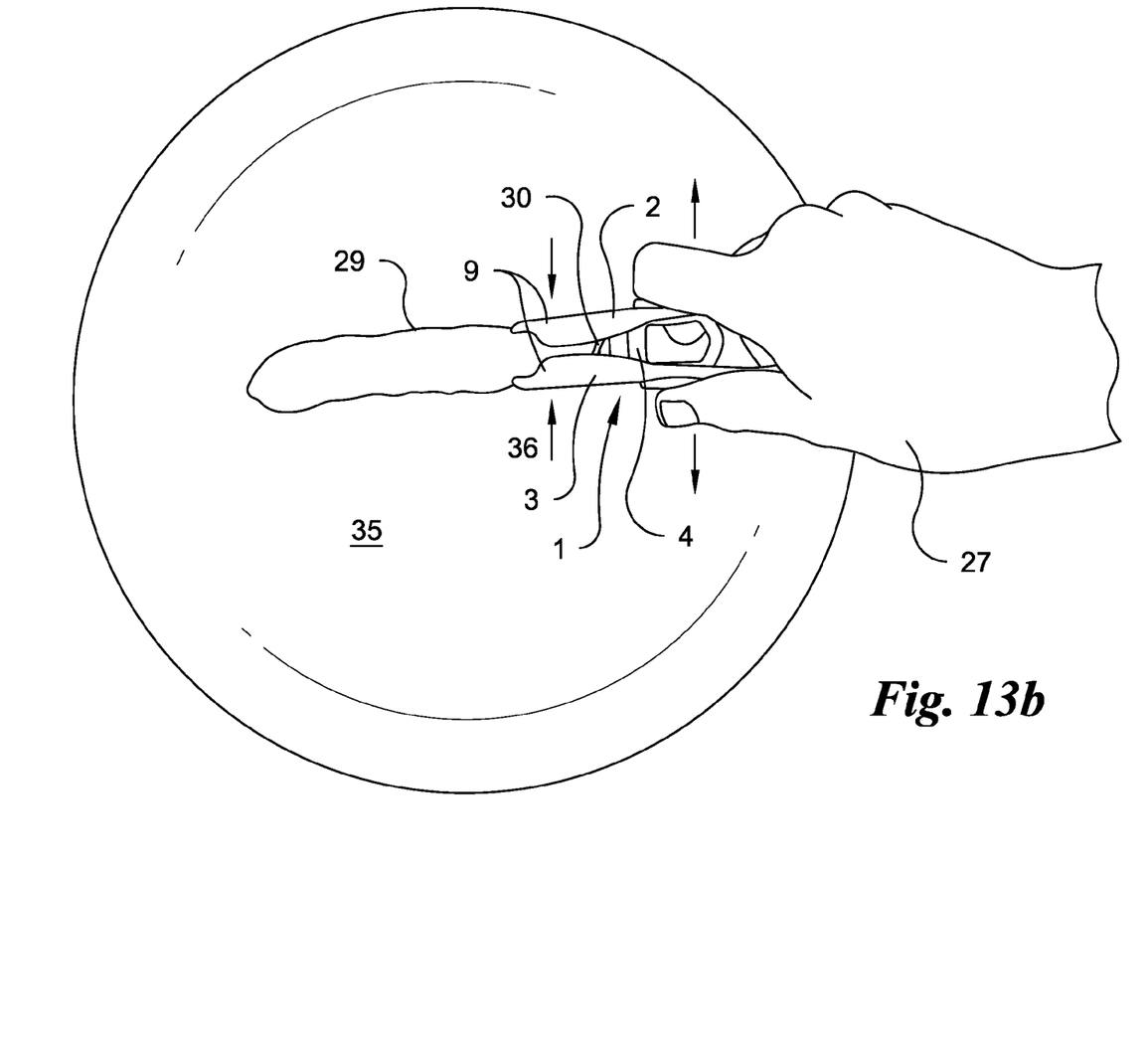
FIG. 13b is a top view illustrating contact between the spare rib and the food clip shown in FIG. 12a after insertion of the one end into the grasping region and removal of the inward force thereby allowing the first and second arms to close about the meat and bone.

Referring now to FIGS. 13a and 13b, an exemplary food clip 1 is shown for demonstration purposes with application to a spare rib 29; although, it is understood that the food clip 1 is applicable to other food items. The user grasps the handle region 7 with her hand 27 so that her index finger and thumb are disposed about the first and second arms 2, 3 immediately adjacent to the hinge 4 and contacting the fasteners 5. Her remaining fingers and palm surround and support the handle region 7. The fingers and thumb mutually apply an inward force 28 which compresses and/or deforms at least a portion of the hinge 4 so as to separate or open the first and second arms 2, 3 within the grasping region 8. After the grasping region 8 is in the open position, the user places the lower extension 10 against the surface of a plate 35 or the like and then slides it towards the spare rib 29 so as to direct one end 30 onto the lower extension 10 and into the grasping region 8. In this example, the end 30 is a meat covered bone; however, it could also be only meat or a bone. Further, the ability to grasp both meat and/or bone allows the user to grasp either end of the food item 1. When a sufficiently length of the end 30 is within the grasping region 8, the user removes the inward force 28, while maintaining a grip along the handle region 7. The hinge 4 then returns to nearly its original shape, thus applying a compressive force 36 onto the end 30. The first and second arms 2, 3, upper extensions 9, and lower extension 10 completely or partially contact the end 30 so as to communicate the compressive force 36 about the end 30 and to support the end 30 during use to resist twisting or turning of the spare rib 29 as it is consumed. The spare rib 29 is removed from the food clip 1 by reversing the process described herein.

The description above indicates that a great degree of flexibility is offered in terms of the invention. Although various embodiments have been described in considerable detail with reference to certain preferred versions thereof, other versions are possible. Therefore, the spirit and scope of the appended claims should not be limited to the description of the preferred versions contained herein.

What is claimed is:

1. A food clip comprising:
   (a) a first arm;
   (b) a second arm, said first arm and said second arm being elongated so as to provide a handle region and a grasping region, said first arm and said second arm each having a top edge, a front edge, and a bottom edge along said grasping region, said first arm and said second arm each having an upper extension extending substantially perpendicular and inward from said top edge and said second arm having a lower extension extending substantially perpendicular from said bottom edge towards said first arm; and
   (c) a hinge disposed between and attached to said first arm and said second arm along said handle region, said hinge being a block of material which is deformable or compressible when a force is applied thereon yet sufficiently resilient so as to return to its original shape when said force is removed, said block being nearly as wide as said first arm and said second arm and disposed between said handle region and said grasping region, said hinge shaped so that said grasping region is normally closed and open when said force is applied onto said hinge via said handle region, said grasping region presses against and nearly surrounds an extension from a food item when said first arm and said second arm are closed.

2. The food clip of claim 1, wherein said hinge is polygonal shaped and disposed in a tapered arrangement with at least one cavity.

3. The food clip of claim 2, wherein said hinge includes a slot.

4. The food clip of claim 1, wherein said hinge includes at least one cavity.

5. The food clip of claim 1, wherein said hinge is partially or completely arcuate shaped.

6. The food clip of claim 1, wherein said lower extension forms a scoop.

7. The food clip of claim 1, wherein said top edge or said front edge is serrated.

8. The food clip of claim 1, wherein said lower extension is serrated.

9. The food clip of claim 1, wherein said hinge is comprised of a polymer, an elastomer, a rubber, or a foam.

10. The food clip of claim 1, wherein said hinge is attached to said first arm and said second arm via fasteners.

11. The food clip of claim 10, wherein said fasteners are removable.

12. The food clip of claim 10, wherein said fasteners are fixed to said hinge.

13. The food clip of claim 10, wherein said fasteners include at least one tab, each said tab residing within a pair of aligned slots through said first arm and said hinge or said second arm and said hinge.

14. The food clip of claim 13, wherein said at least one tab is mechanically secured to said slots.

15. The food clip of claim 1, wherein said first arm and said second arm are bonded to said hinge.

16. The food clip of claim 1, wherein said hinge includes at least two tabs, at least one of said at least two tabs residing within a first pair of aligned slots through said first arm and said hinge and at least one of said at least two tabs residing within a second pair of aligned slots through said second arm and said hinge.

17. The food clip of claim 16, wherein said at least two tabs are mechanically secured to said slots.

18. A food clip comprising:
   (a) a first arm;
   (b) a second arm, said first arm and said second arm being elongated so as to provide a handle region and a grasping region, said first arm and said second arm each have a top edge, a front edge, and a bottom edge along said grasping region, said first arm and said second arm each having an upper extension extending substantially perpendicular and inward from said top edge and said second arm having a lower extension extending substantially perpendicular from said bottom edge towards said first arm; and
   (c) a hinge disposed between and attached to said first arm and said second arm along said handle region, said hinge comprised of a compressible or deformable yet resilient block-shaped element, said hinge shaped so that said grasping region is normally closed and open when a force is applied onto said hinge via said handle region, said grasping region presses against and nearly surrounds an extension from a food item when said first arm and said second arm are closed.

19. A food clip comprising:
   (a) a first arm;
   (b) a second arm, said first arm and said second arm being elongated so as to provide a handle region and a grasping region; and
   (c) a hinge disposed between and attached to said first arm and said second arm along said handle region, said hinge comprised of a compressible or deformable yet resilient block-shaped element, said hinge shaped so that said grasping region is normally closed and open when a force is applied onto said hinge via said handle region, said grasping region presses against and nearly surrounds an extension from a food item when said first arm and said second arm are closed, said hinge attached to said first arm and said second arm via at least one tab, each said tab residing within a pair of aligned slots through said first arm and said hinge or said second arm and said hinge.

* * * * *